United States Patent [19]

Takahashi et al.

[11] 3,780,596

[45] Dec. 25, 1973

[54] FLOATING SUPPORT FOR THE SHIFT LEVER IN A SHIFT ASSEMBLY FOR A TRANSMISSION

[75] Inventors: Seihachi Takahashi; Nobuaki Katayama; Hideki Morino, all of Aichi-ken, Japan

[73] Assignee: Toyota Jidosha Kogyo Kabushiki Kaisha, Aichi-ken, Japan

[22] Filed: Jan. 24, 1973

[21] Appl. No.: 326,458

[30] Foreign Application Priority Data
Jan. 28, 1972   Japan.............................. 47/010365

[52] U.S. Cl............................................ 74/473 P
[51] Int. Cl............................................ G05g 9/12
[58] Field of Search.................................... 74/473 P

[56] References Cited
UNITED STATES PATENTS
1,852,979   4/1932   Moorhouse..................... 74/473 P
2,174,504   9/1939   Cole................................ 74/473 P Primary Examiner—Milton Kaufman
Attorney—David Toren et al.

[57] ABSTRACT

In a direct-shift type transmission, the shift lever is floatingly supported within an axially-extending retainer in the transmission case by means of a spring axially biasing the shift lever and also by the combination of a seat ring and a resilient member. The seat ring is axially movable within the retainer and has a spherically-shaped surface in contact with a spherically-shaped surface on the shift lever. The resilient member is positioned between a support surface on the retainer and the seat ring so that it resiliently supports the seat ring against the biasing action of the spring.

14 Claims, 13 Drawing Figures

FIG. 3
FIG. 4
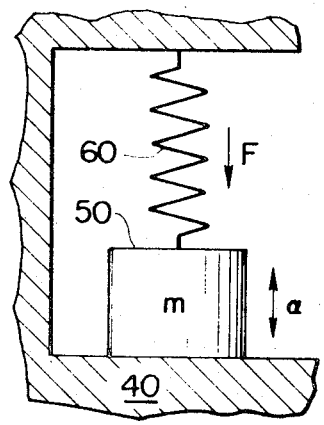
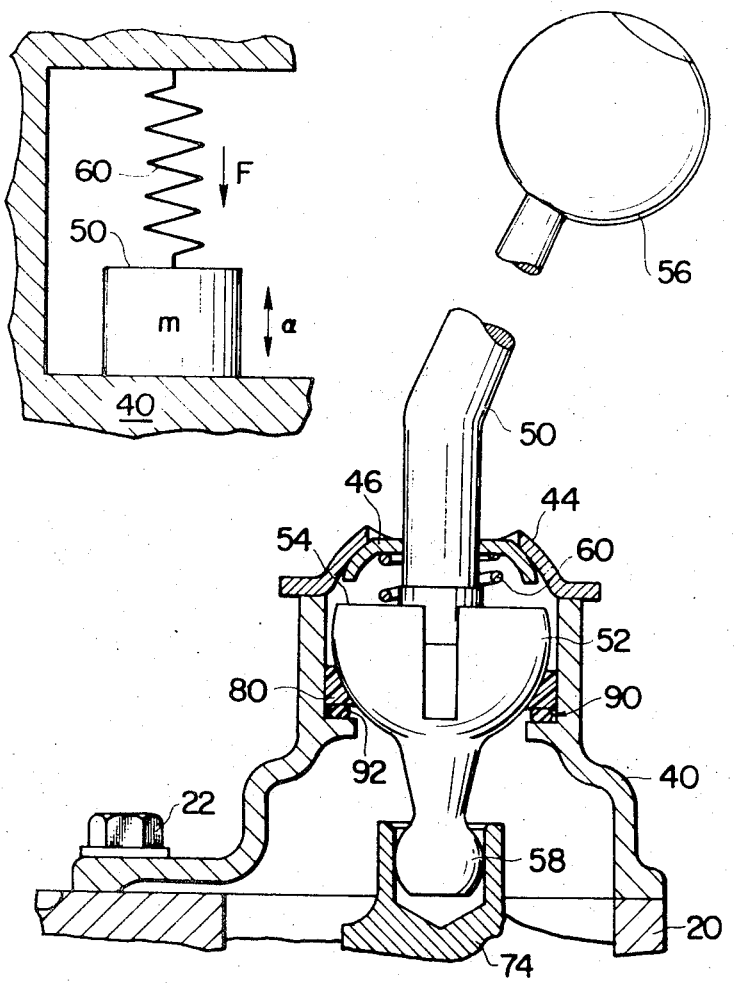

FLOATING SUPPORT FOR THE SHIFT LEVER IN A SHIFT ASSEMBLY FOR A TRANSMISSION

BACKGROUND OF THE INVENTION

1. FIELD OF THE INVENTION

This invention relates to a shift-lever supporting structure for the transmission of an automobile and the like.

2. DESCRIPTION OF THE PRIOR ART

Vehicles using the conventional direct-shift type transmissions have a common problem of unusual vibrations in the shift lever in the range of the point of bending resonance of the driving system, and also of rattling of the shift lever with an increase in engine speed. The vibration and noise often make driving difficult and unpleasant.

The problems caused by vibration and rattling stem from the driving system of a vehicle of the front-engine-rear-drive type, as shown in FIG. 1 of the accompanying drawings, having a power plant that comprises an engine E, a clutch C, a transmission T, and a differential D connected to the power plant by a propeller shaft P with universal joints J, further a shift lever mounting S reaches a very high vibration level in the range of the point of bending resonance of the driving system, and the shift lever is caused to vibrate up and down.

The vibration and rattling of the shift lever due to the bending resonance of the driving system have very important relations to the supporting structure for the shift lever.

In FIG. 2, the construction of a conventional direct-shift type transmission is shown and includes a transmission case 10 accommodating change gears, not shown, and an extension housing 20 connected to the rear end of the transmission case 10 and through which the output shaft 30 of the transmission extends. A retainer 40 for a shift lever 50 is secured to the extension housing 20 with bolts 22. The shift lever 50 has a substantially semispherically shaped portion 52 intermediate its ends. The portion 52 is in sliding contact with a spherically shaped seat 42 integrally formed in the shift lever retainer 40, and is seated therein with spring pressure exerted by a spring 60 which is interposed between the upper flat face 54 of the portion 52 and a spring seat 46 of a cap 44 attached to the shift lever retainer 40. By this arrangement the shift lever 50 is supported rockably in the directions of a given shift pattern, that is, in the selection direction (to the right and left with respect to the front of the car) and in the shifting direction (in the forward and reverse directions of the car). The shift lever 50 has a knob 56 on its upper end and a finger 58 on its lower end. The finger 58 is fitted in a shift lever housing 74, which in turn is rigidly connected to a selecting-and-shifting lever shaft 70 with a spring pin 72, so that the selecting-and-shifting lever shaft 70 transmits the selecting action of the shift lever 50 as a rotational motion and the shifting action of the lever as an axial motion. The cap 44 and the lower portion of the shift lever 50 are covered with a boot 48 to keep water and dust from entering the transmission.

A technical analysis of the conventional direct-shift type transmission having the construction as shown in FIG. 2 indicates that the transmission represents a model of vibration dynamics as illustrated in FIG. 3, wherein:

$m$ is the mass of the shift lever 50;
$F$ is the mounting (initial) load by the spring 60; and
$a$ is the acceleration of vertical vibration of the shift lever mountings.

With the conventional direct-shift type transmission wherein the portion 52 of the shift lever 50 is directly seated by spring means in the spherical seat 42 of the shift lever retainer 40, it can occur that, when the mounting (initial) load F that is given by the spring 60 is small, namely, $F < ma$, the spherical portion 52 of the shift lever 50 repeatedly bounces up from and down in the spherically shaped seat 42 of the shift lever retainer 40 at the bending resonance of the driving system, thus causing rattling.

Conversely, if the mounting (initial) load by the spring 60 or the value F is sufficiently large, namely, $F < ma$, then while no rattling occurs, both the shift lever 50 and the shift lever retainer 40 vibrate sympathetically to such an extent that the driver gripping the knob 56 senses unusual vibration.

Moreover, an increase in the mounting (initial) load F by the spring 60 leads to an increased sliding friction between the portion 52 of the shift lever 50 and the spherically shaped seat 52 of the shift lever retainer 40, with consequent lack of smoothness of shifting operation and an unpleasant feel in manual shifting. In view of these factors, the value F cannot be too large and if maintained at a low level, rattling is produced between the spherical portion 52 of the shift lever 50 and the spherical seat of the shift lever retainer 40, thus causing difficulties for the driver.

SUMMARY OF THE INVENTION

It is an object of this invention to provide a shift lever support structure for reducing to a large extent the vertical vibration of the shift lever and for preventing the lever from causing rattling in the shift assembly.

Another object of the invention is to provide a direct-shift type transmission wherein the vertical vibration of the shift lever is reduced and the rattling ascribable to the lever is eliminated effectively without sacrificing any of the feel of the shift lever operation.

Still another object of the invention is to provide a direct-shift type transmission capable of solving the problems of conventional transmissions without materially altering the conventional structure and affording a very simple structure.

These objects are realized by an improved structure according to the present invention, which resides, in essence, in a direct-shift type of transmission comprising a transmission case incorporating change gears, an extension housing connected to the rear end of the transmission case, a shift lever retainer having a spherically shaped seat and attached to the transmission case or the extension housing, and a shift lever having a semispherical shaped portion for sliding contact with the spherically shaped seat of the shift lever retainer. The semispherically shaped portion is pressed against the spherically shaped seat by a spring so that the shift lever is supported by the semispherically shaped portion rockably in any direction of a given shift pattern. The invention is characterized in that the spherically shaped seat of the shift lever retainer is in the form of a separate seat ring with a spherically shaped surface, with the seat ring being vertically movable with respect to the shift lever retainer for following the movement of the semispherical portion of the shift lever, and an elastic member is interposed between the seat ring and the shift lever retainer, so that the spring and elastic member coact to allow the shift lever to float from the shift lever retainer when vibration is given to the lever.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 3 is a diagrammatic view of a model of the vibration dynamics in a structure of the type shown in FIG. 2;

FIG. 4 is a partial sectional view, on an enlarged scale, of an embodiment of the present invention;

DESCRIPTION OF THE PREFERRED EMBODIMENTS

Figure 1:
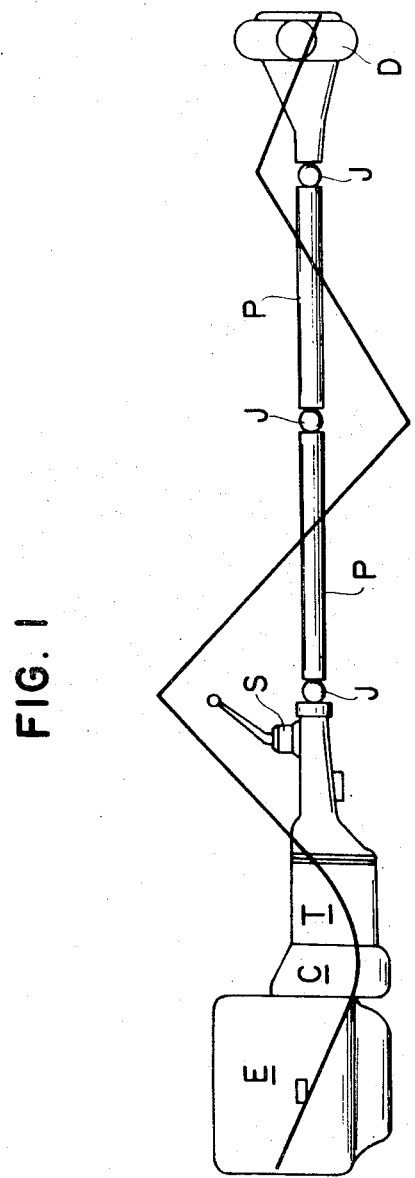
FIG. 1 is a schematic view showing the mode of bending resonance (in the vertical direction) of the driving system of a conventional vehicle of front-engine-rear-drive type.
Figure 2:
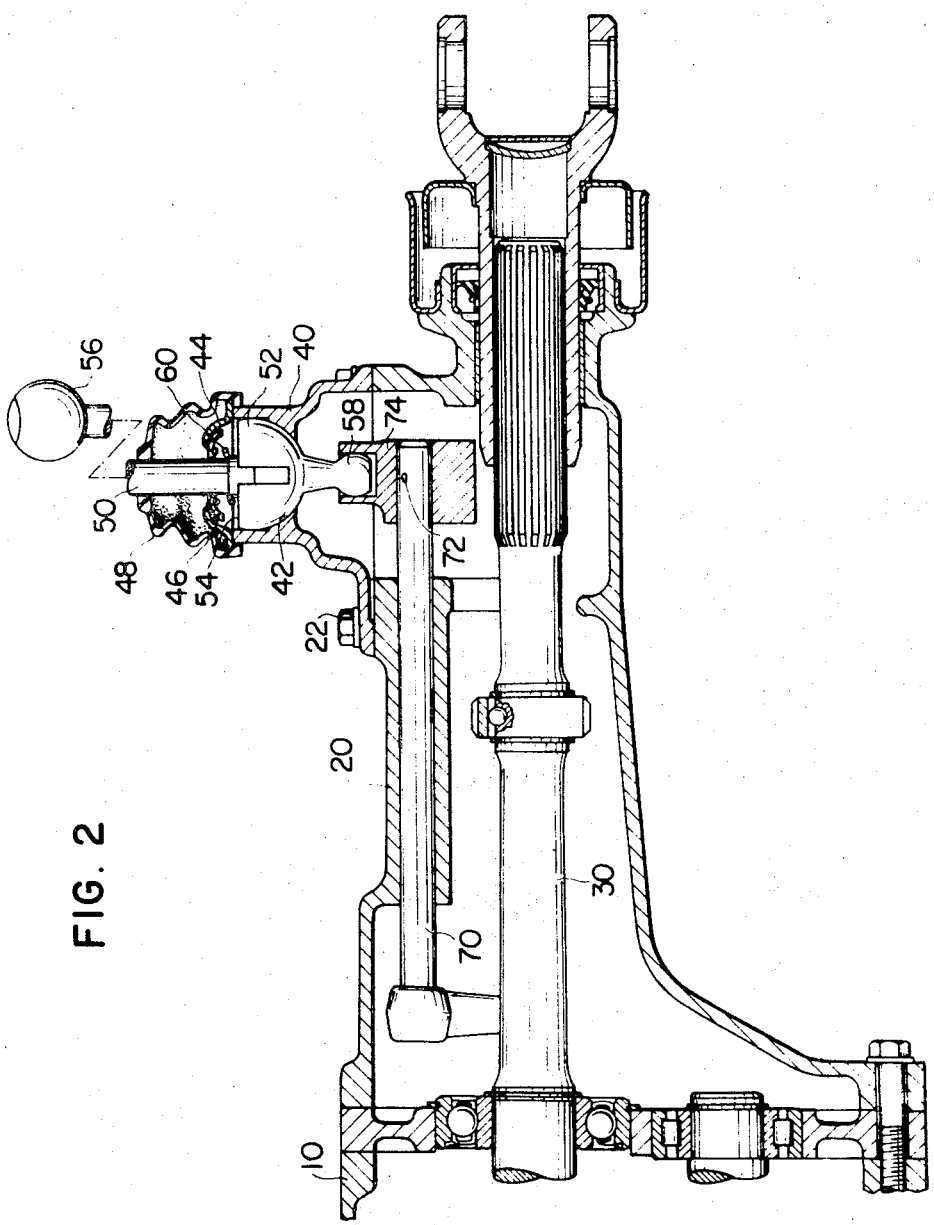
FIG. 2 is a partial vertical sectional view of a conventional direct-shift type transmission.

Preferred embodiments of the present invention based upon the concept defined above are described hereunder with reference specifically to FIGS. 4 to 13 of the accompanying drawings, wherein the same numerals designate like or corresponding parts and detailed explanation thereof is omitted. Where spherically shaped surfaces are referred to herein, it is intended to cover surfaces which form only a portion of a sphere.

Referring first to FIG. 4, there is shown a first embodiment of the invention. Just as in the conventional arrangement, the spherically shaped portion 52 of a shift lever 50 is supported in biased contact with the spherically shaped seat of a shift lever retainer 40 by a spring 60. However, the spherically shaped seat of the shift lever retainer 40 is not formed integrally with the inner wall of the shift lever retainer 40 but is formed of a separate seat ring 80 having a spherically shaped surface, which is movable with respect to the shift lever retainer 40 so that it can follow the movement of the spherically shaped portion 52 of the shift lever 50. Interposed between the lower surface of the seat ring 80 and the shift lever retainer 40 is an elastic member 90 having a suitable spring constant. The elastic member 90 is shown as a rubber ring 92, having a round cross section. It biases the seat ring 80 upwardly against the spherically shaped portion 52 of the shift lever 50. The shift lever 50 is thus supported between the spring 60 and rubber ring 92 floating within the shift lever retainer 40. Consequently, the major vibration from the shift lever retainer 40 is eliminated and the vibration of the shift lever 50 is largely eliminated, thus providing the shifting operation with a good feel as it is manipulated by the driver. Because the seat ring 80 is pressed against the spherically shaped portion 52 of the shift lever 50 by the rubber spring 92, due to the floating action provided, there is no possibility of rattling between the spherically shaped portion 52 and the spherically shaped surface in the seat ring 80.

Figure 5:
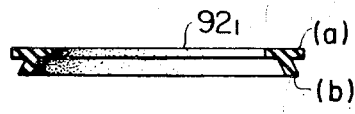
FIGS. 5 and 6 are sectional views and FIG. 7 is a perspective view of resilient or rubber rings with different cross-sectional shapes embodying the invention.
Figure 6:
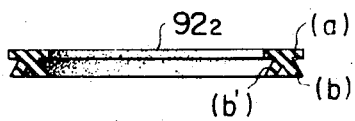
Figure 7:
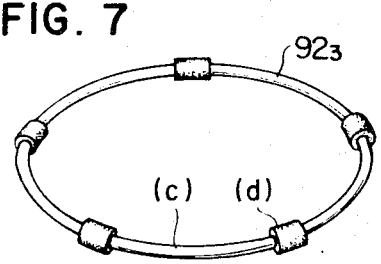

Since it is desirable for the elastic member 90 to maintain the same spring constant for the control of vibration noise, the cross-sectional shapes of the rubber rings 92 as shown in FIGS. 5 through 7 are modified to keep their spring constants as similar as possible and to make them soft. FIG. 5 shows the second embodiment of the invention, or a modified form of rubber ring $92_1$, which has a cross section consisting of a horizontally-extending flat ring $a$ arranged to contact the seat ring 80, and a downwardly-extending leg $b$ which is inclined at an acute angle to the portion $a$ and is arranged to contact the shift lever retainer 40. This modification is designed so that the mild elastic deformation of the leg $b$ can be utilized.

FIG. 6 shows the third embodiment which is also in the form of a rubber ring $92_2$ and has a cross section similar to the embodiment of FIG. 5 but with an additional downwardly-extending leg $b'$ arranged at an acute angle to both the other leg $b$ and the horizontally-extending portion $a$.

FIG. 7 shows the fourth embodiment which is in the form of a rubber ring $92_3$. The ring $92_3$ has a small-diameter section $c$ on which a plurality of larger-diameter portions $d$ are positioned at regular intervals. These rubber rings 92, $92_1$, $92_2$, and $92_3$ may be placed as separate members between the seat ring 80 and the shift lever retainer 40 or they may be integrally attached to the lower surface of the seat ring 80.

Figure 8:
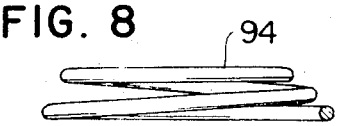
FIGS. 8 and 9 are views of elastic members, in the form of springs, embodying the invention.
Figure 9:

FIGS. 8 and 9 show fifth and sixth embodiments of the invention in the form of a conical spring 94 and a wavy leaf spring 96, respectively, for replacing the rubber rings 92, $92_1$, $92_2$ and $92_3$ for use as the elastic member 90 arranged between the seat ring 80 and the shift lever retainer 40.

Figure 10:
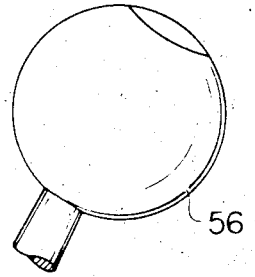
FIGS. 10 and 11 are side views partly in section, illustrative of the use of a conical spring, as shown in FIG. 8, as a further embodiment of the invention.
Figure 10:
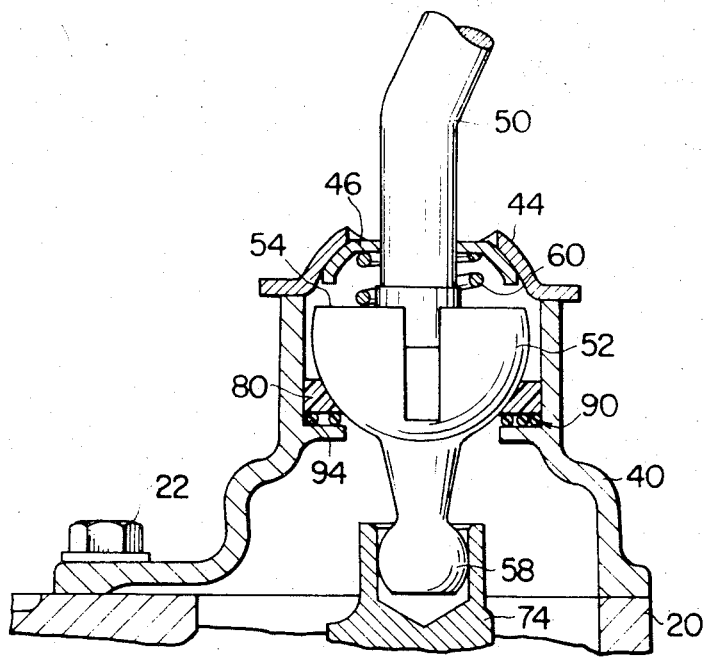
Figure 11:
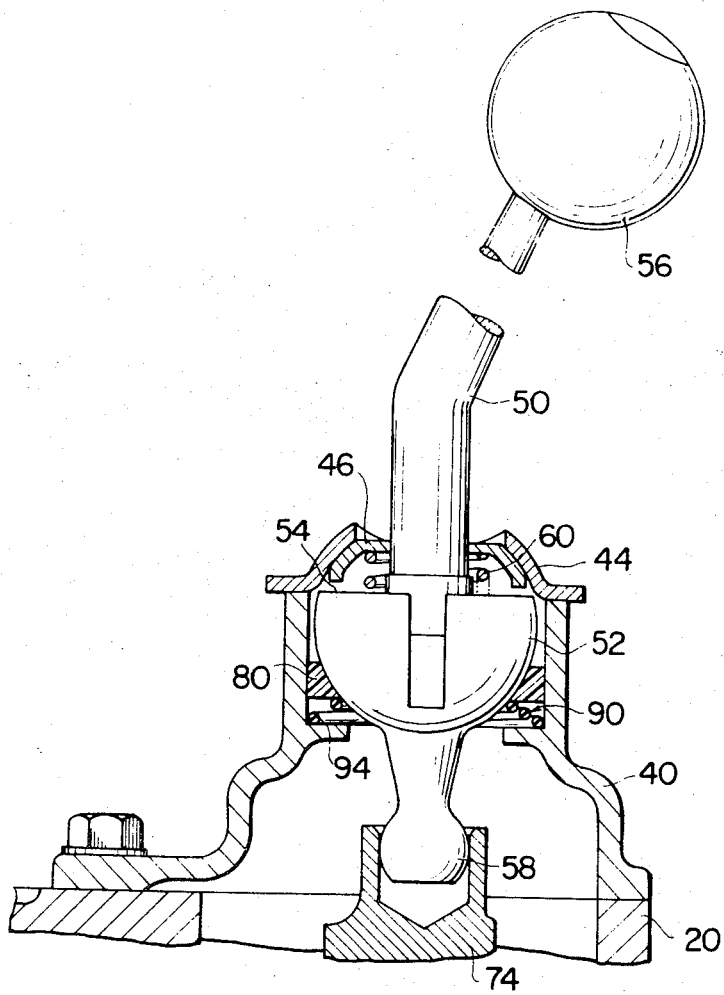

When an elastic member 90 in the form of a conical spring 94 as shown in FIG. 8 is used, the spring, in its initial state of loading, is flattened as in FIG. 10. Therefore, the conical spring 94 works when an upward vibratory acceleration is applied as shown in FIG. 11 or a vibratory acceleration is applied in the downward direction from the state in FIG. 11, On the other hand, the spring has no action whatsoever when a downward vibratory acceleration is supplied while the spring is in the state of initial mounting as in FIG. 10. In this sense the spring differs from the rubber rings 92, $92_1$, $92_2$, and $92_3$ as illustrated in FIGS. 4 through 7. However, because vertical vibratory acceleration is usually applied without interruption, the conical spring 94 works in the same manner as a rubber ring so that, when subjected to vibration, the shift lever 50 is supported and floats between the spring 60 and the conical spring 94 within the shift lever retainer 40. As a result, the conical spring 94 can damp the vibration of the shift lever 50 and avoid rattling which is otherwise caused by the shift lever 50, in as satisfactory a manner as afforded by the rubber rings 92, $92_1$, $92_2$, and $92_3$. Furthermore, at all times the conical spring 94 has the same spring constant, and the value of the spring constant can be freely chosen. These are particularly advantageous features for the practical use of the elastic or resilient member.

Figure 12:
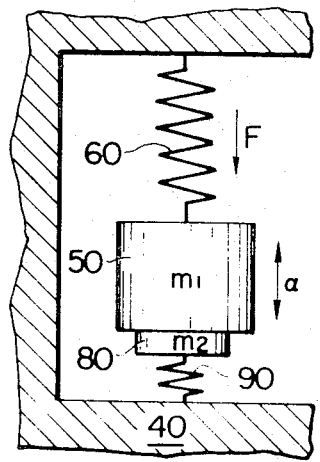
FIG. 12 is a diagrammatic view of a model of the vibration dynamics of the shift lever for each of the embodiments of the invention.

The embodiments of the present invention described above invariably constitute a model of vibration dynamics as shown in FIG. 12 when the shift lever 50 is subjected to vibration. In the model, $m_1$ is the mass of the shift lever 50, and $m_2$ is the mass of the seat ring 80.

As will be appreciated from the model, the shift lever 50 floats, together with the seat ring 80, between the spring 60 and elastic member 90. In this arrangement the major vibration of the shift lever retainer 40, due to the bending resonance of the driving system, is isolated and the vibration of the shift lever 50 is damped to a negligible value. Further, because the spherically shaped surface of the seat ring 80 is always pressed against the spherically shaped portion 52 of the shift lever 50 by the elastic member 90, no rattling occurs because of the floating support of the spherically shaped portion 52 and of the seat ring 80. In addition, because the vibratory noise can be effectively eliminated without increasing the mounting (initial) load of the spring 60, the manual shifting of the lever is not heavy and a very comfortable feel is obtained during the operation of the shift lever. The structure is quite simple because there is no need for major alterations of the conventional design and construction.

The conditions essential for supporting the shift lever in accordance with the present invention are as follows:

For protection against vibration, the shift lever 50 is required to have a point of resonance sufficiently lower than the point of bending resonance of the driving system, or at most one-half of the latter.

Therefore:

$$f/2 > 1/2 \sqrt{k_1 + k_2/m_1 + M_2} \quad (1)$$

where $m_1$ is the mass of the shift lever 50;
$m_2$ is the mass of the spherical seat ring 80;
$k_1$ is the spring constant of the spring 69;
$k_2$ is the spring constant of the elastic member 90; and
$f$ is the frequency of bending resonance of the driving system. Further,
X is the maximum amplitude of the shift lever retainer 40 at the point of bending resonance of the driving system; and
F is the mounting (initial) load by the spring 60.

The conditions under which the shift lever 50 and the shift lever retainer 40 are kept in intimate contact in order to preclude rattling are $$k_2 \leq k_1 \, m_2 a - F/m_1 a + F + F(m_1 + m_2)/m_1 a + F \cdot (2\pi f)^2 \quad (2)$$

$$L/X + (2\pi f)^2$$

Therefore, it is only necessary to set the values $m_1$, $m_2$, $k_1$, $K_2$ and $F$ that satisfy the formulas (1) and (2) above.

Figure 13:
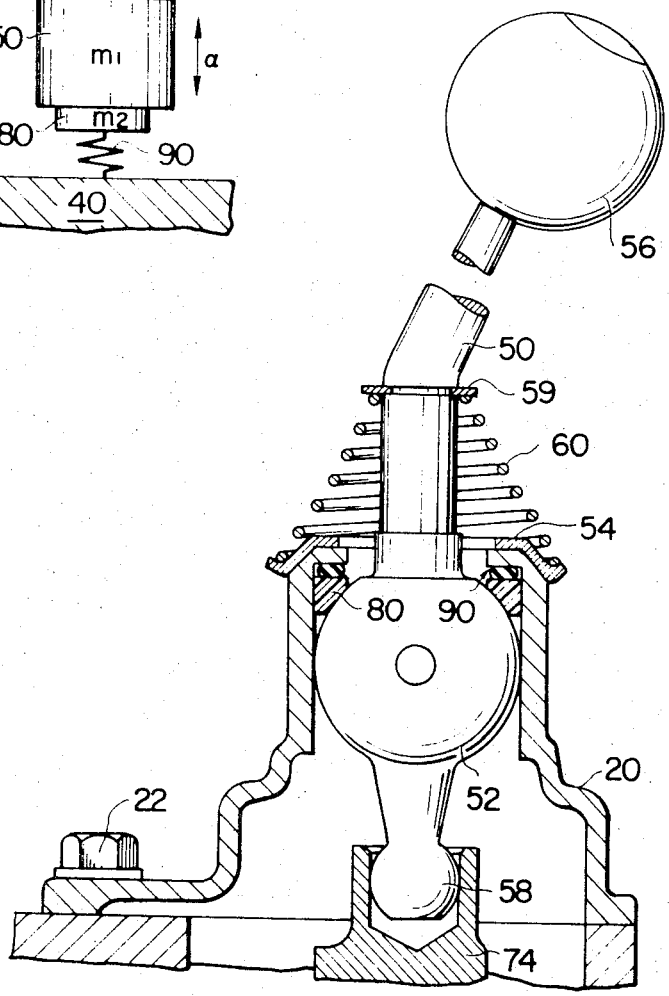
FIG. 13 is a sectional view of a further embodiment of the invention.

While thus far the present invention has been described in connection with the embodiments in which the spherically shaped portion 52 of the shift lever 50 is biased downwardly by the spring 60 into contact with the spherically shaped surface of the seat of the shift lever retainer 40, the invention is equally applicable to a direct-shift type transmission wherein, for example, as shown in FIG. 13, the spring 60 is interposed between a cap 54 secured to the shift lever retainer 40 and a snap ring 59 rigidly connected to the shift lever 50 in urging the shift lever 50 upwardly so that the upper face of the spherically shaped portion 52 of the shift lever 50 and the spherically shaped seat of the shift lever retainer 40 can be maintained in a sliding contact with one another. In this case, too, the spherically shaped surface of the seat of the shift lever retainer 40 which contacts the upper part of the portion 52 of the shift lever 50 may take the form of a vertically movable spherically shaped seat ring 80, with an elastic member 90 interposed between the upper surface of the seat ring 80 and the shift lever retainer 40. The present invention is applicable to other direct-shift type transmissions as well as that provided by the sliding contact between the spherically shaped surfaces of the shift lever 50 and the shift lever retainer 40.

Throughout the embodiments herein described, the spherical seat ring 80 is preferably made of polyurethane, rubber, synthetic resin, etc. because the material can, to an appreciable degree, absorb the rattling which develops.

While specific embodiments of the invention have been shown and described in detail to illustrate the application of the inventive principles, it will be understood that the invention may be embodied otherwise without departing from such principled.

What is claimed is:

1. In a direct-shift type transmission comprising a transmission case arranged to contain change gears, a transversely extending shift lever retainer attached to said transmission case and having a seat with a spherically shaped surface thereon, a shift lever extending into said transmission case in the axial direction of said shift lever retainer and having a portion with a spherically shaped surface thereon located within said shift lever retainer and arranged with its s spherically shaped surface in sliding contact with the spherically shaped surface of said seat in said retainer, spring means arranged to bias the spherically shaped surface of said portion and seat together so that said shift lever is rockable in the directions of a given shift pattern, wherein the improvement comprises that said shift lever retainer has a support surface therein and said seat includes a separate seat ring having a spherically shaped surface thereon with the spherically shaped surface thereof in contact with the spherically shaped surface of said portion of said shift lever, said seat ring being displaceable in the axial direction of said retainer, and a resilient member positioned between said seat ring and the support surface in said shift lever retainer for combining with said spring means and providing a floating effect on said shift lever when said shift lever is exposed to vibration.

2. In a direct-shift type transmission, as set forth in claim 1, wherein said resilient member comprises a ring-shaped elastic member.

3. In a direct-shift type transmission, as set forth in claim 2, wherein said ring-shaped elastic member has a circular shape in radial section.

4. In a direct-shift type transmission, as set forth in claim 3, wherein said ring-shaped elastic member includes a plurality of short length circular-shaped sections mounted on and extending outwardly from the surface of said ring-shaped elastic member, and angularly spaced from one another.

5. In a direct-shift type transmission, as set forth in claim 2, wherein said ring-shaped elastic member comprises a flat ring-shaped section extending transversely of the axial direction of said retainer and at least one leg extending at an acute angle from said flat ring-shaped section and outwardly therefrom relative to the axis of said retainer.

6. In a direct-shift type transmission, as set forth in claim 5, wherein said ring-shaped member has a second leg extending from the same side of said flat ring-shaped section as said at least one leg and is disposed at an acute angle to said flat ring-shaped section and extends inwardly therefrom relative to the axis of said retainer.

7. In a direct-shift type transmission, as set forth in claim 2, wherein said ring-shaped elastic member is formed of polyurethane.

8. In a direct-shift type transmission, as set forth in claim 2, wherein said ring-shaped elastic member is formed of rubber.

9. In a direct-shift type transmission, as set forth in claim 2, wherein said ring-shaped elastic member is formed of a synthetic resin.

10. In a direct-shift type transmission, as set forth in claim 1, wherein said resilient member comprises a conically-shaped spring.

11. In a direct-shift type transmission, as set forth in claim 1, wherein said resilient member comprises a ring-shaped leaf spring member having a wavy configuration undulating relative to a plane extending transversely of the axis of said retainer.

12. In a direct-shift type transmission, as set forth in claim 1, wherein said spring means comprises a coil spring encircling said shift lever and located within said retainer extending between said retainer and said portion of said shift lever.

13. In a direct-shift type transmission, as set forth in claim 12, wherein said coil spring is located on an opposite side of said retainer from said resilient member.

14. In a direct-shift type transmission, as set forth in claim 1, wherein said spring means comprises a coil spring encircling said shift lever and located exteriorly of said retainer, a snap ring connected to and extending transversely of said shift lever at a position spaced from said retainer, said coil spring extending axially from said retainer to said snap ring, and said resilient member located within said retainer at the end thereof adjacent said coil spring.

* * * * *